(12) United States Patent
Tellis et al.

(10) Patent No.: US 10,086,839 B2
(45) Date of Patent: Oct. 2, 2018

(54) SEMIAUTONOMOUS VEHICLE CONTROL SYSTEM

(71) Applicant: Ford Global Technologies, LLC, Dearborn, MI (US)

(72) Inventors: Levasseur Tellis, Southfield, MI (US); Sarra Awad Yako, Allen Park, MI (US); Gerald H. Engelman, Plymouth, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 73 days.

(21) Appl. No.: 15/271,548

(22) Filed: Sep. 21, 2016

(65) Prior Publication Data

US 2018/0079414 A1   Mar. 22, 2018

(51) Int. Cl.
| | |
|---|---|
| *B60W 30/182* | (2012.01) |
| *B60W 10/30* | (2006.01) |
| *B60W 10/20* | (2006.01) |
| *G05D 1/02* | (2006.01) |
| *G05D 1/00* | (2006.01) |
| *B60W 50/08* | (2012.01) |
| *B60W 10/04* | (2006.01) |
| *B60W 10/184* | (2012.01) |

(52) U.S. Cl.
CPC .......... *B60W 30/182* (2013.01); *B60W 10/04* (2013.01); *B60W 10/184* (2013.01); *B60W 10/20* (2013.01); *B60W 10/30* (2013.01); *B60W 50/082* (2013.01); *G05D 1/0088* (2013.01); *G05D 1/021* (2013.01); *B60W 2550/12* (2013.01); *B60W 2600/00* (2013.01)

(58) Field of Classification Search
CPC .. B60W 30/182; B60W 10/30; B60W 50/082; B60W 10/04; B60W 10/20; B60W 10/184; B60W 2550/12; B60W 2600/00; G05D 1/021; G05D 1/0088
See application file for complete search history.

(56) References Cited

U.S. PATENT DOCUMENTS

| | | | |
|---|---|---|---|
| 8,757,807 | B1 | 6/2014 | Disley |
| 9,235,211 | B2 | 1/2016 | Davidsson et al. |
| 2013/0131907 | A1 | 5/2013 | Green et al. |
| 2014/0300479 | A1 | 10/2014 | Wolter et al. |
| 2014/0303827 | A1* | 10/2014 | Dolgov ................. B60W 30/00 701/23 |
| 2015/0094898 | A1* | 4/2015 | Tellis .................... B60W 40/12 701/23 |

(Continued)

FOREIGN PATENT DOCUMENTS

| | | |
|---|---|---|
| DE | 4226747 C1 | 12/1993 |
| DE | 102008038816 A1 | 2/2010 |

*Primary Examiner* — Frederick M Brushaber
(74) *Attorney, Agent, or Firm* — Frank A. MacKenzie; Bejin Bieneman PLC

(57) ABSTRACT

A controller includes a processor and a memory storing processor-executable instructions. The processor is programmed to activate a first autonomy mode to control steering and at least one of propulsion and braking. The processor is further programmed to, while in the first autonomy mode, disregard a command from an occupant to perform an action interfering with an ability of the occupant to one of see a field of travel of a vehicle and provide input to the vehicle.

18 Claims, 5 Drawing Sheets

(56) References Cited

U.S. PATENT DOCUMENTS

| | | | |
|---|---|---|---|
| 2015/0261219 A1* | 9/2015 | Cuddihy | B60J 1/2016 |
| | | | 701/23 |
| 2016/0082867 A1* | 3/2016 | Sugioka | B60N 2/442 |
| | | | 701/49 |
| 2017/0227960 A1* | 8/2017 | Joyce | G05D 1/0061 |
| 2017/0235305 A1* | 8/2017 | Jung | B60W 40/072 |
| | | | 701/23 |
| 2017/0297569 A1* | 10/2017 | Nilsson | G05D 1/0061 |
| 2017/0349186 A1* | 12/2017 | Miller | G05D 1/0088 |
| 2017/0364072 A1* | 12/2017 | Yako | G01C 21/34 |
| 2017/0369052 A1* | 12/2017 | Nagy | B60W 30/09 |
| 2018/0004204 A1* | 1/2018 | Rider | G05D 1/0061 |

\* cited by examiner

SEMIAUTONOMOUS VEHICLE CONTROL SYSTEM

BACKGROUND

Various entities define levels of autonomy that classify vehicles according to how autonomously the vehicles can operate. For example, the National Highway Traffic Safety Administration (NHTSA) establishes five levels (0 to 4) and defines Level 2 autonomy as "automation of at least two primary control functions designed to work in unison to relieve the driver of control of those functions," for example, "adaptive cruise control in combination with lane centering." NHTSA defines Level 3 autonomy as "enabl[ing] the driver to cede full control of all safety-critical functions under certain traffic or environmental conditions and in those conditions to rely heavily on the vehicle to monitor for changes in those conditions requiring transition back to driver control," for example, "signal[ing] to the driver to reengage in the driving task" in response to "an oncoming construction area."

Similarly, the Society of Automotive Engineers (SAE) establishes six levels (0 to 5) and defines Level 2 autonomy as "the driving mode-specific execution by one or more driver assistance systems of both steering and acceleration/deceleration using information about the driving environment and with the expectation that the human driver perform all remaining aspects of the dynamic driving task." SAE defines Level 3 autonomy as "the driving mode-specific performance by an automated driving system of all aspects of the dynamic driving task with the expectation that the human driver will respond appropriately to a request to intervene."

During Level 2 or 3 autonomous driving under either set of definitions, a vehicle occupant is expected to maintain attention on the task of driving the vehicle while the vehicle performs many of the actions of the driving task and/or be prepared to take over operation of the vehicle. This is a problem particular to semi-autonomous vehicles. If the vehicle has full autonomy, then the occupant typically is not expected to maintain attention on the driving task. If the vehicle is nonautonomous, then the occupant is a driver is constantly performing actions to control the vehicle, which thus maintains the attention of the driver.

DETAILED DESCRIPTION

Figure 1:
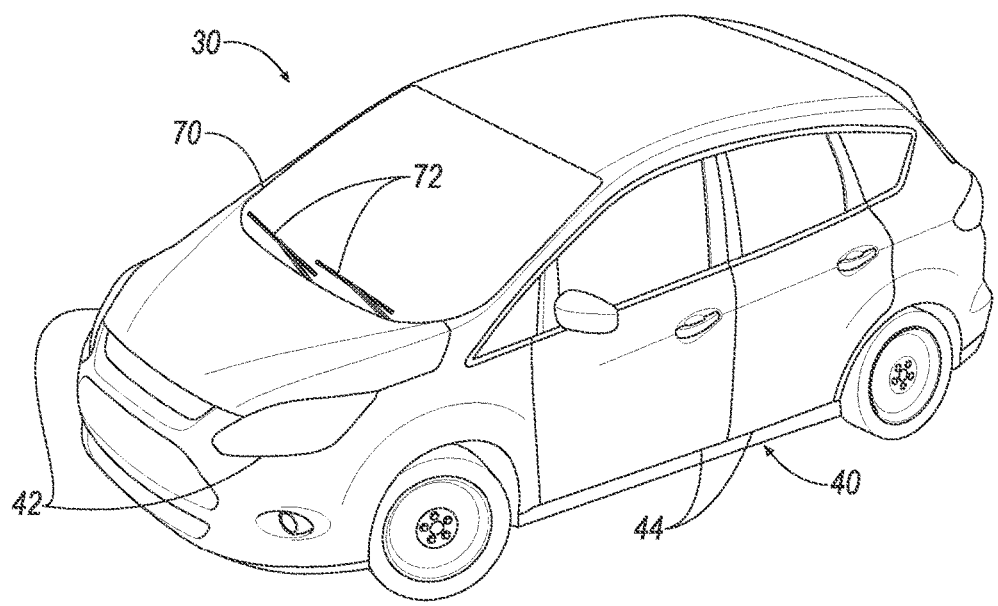
FIG. 1 is a perspective view of an example vehicle.

With reference to the Figures, wherein like numerals indicate like parts throughout the several views, a controller 32 includes a processor and a memory storing processor-executable instructions. The processor is programmed to activate a first autonomy mode to control steering 34 and at least one of propulsion 36 and braking 38. The processor is further programmed to, while in the first autonomy mode, disregard a command from an occupant to perform an action interfering with an ability of the occupant to see a field of travel of a vehicle 30 and/or provide input to the vehicle 30. (The adjectives "first" and "second" are used throughout this document as identifiers and are not intended to signify importance or order.)

The controller 32 as disclosed herein addresses a problem arising in control of semiautonomous vehicles, and provides a solution that allows for enhanced control of semiautonomous vehicles. For example, the presently disclosed subject matter provides for maintaining the attention of a human operator on the driving task and maintaining the preparedness of the human operator to assume control of the semi-autonomous vehicle 30.

With reference to FIG. 1, the vehicle 30 includes a body 40. The body 40 may be of a unibody construction in which at least some of the body 40 is exposed and may present a class-A surface (not numbered), i.e., a surface specifically manufactured to have a high-quality, finished aesthetic appearance free of blemishes. The body 40 may, alternatively, be of a body-on-frame construction, or of any other suitable construction. The body 40 may be formed of any suitable material, for example, steel, aluminum, etc.

The vehicle 30 includes headlamps 42. The headlamps 42 may be fixed relative to the frame and disposed at a front of the vehicle 30 facing in a vehicle-forward direction. The headlamps 42 may be any lighting system suitable for illuminating a roadway in front of the vehicle 30, including tungsten, halogen, high-intensity discharge (HID) such as xenon, light-emitting diode (LED), laser, etc. The headlamps 42 may be stationary or adaptive, that is, capable of rotating relative to the body 40 based on, for example, changing a direction of travel of the vehicle 30.

The vehicle 30 may include doors 44. The doors 44 may be attached to and rotatable relative to the body 40. The doors 44 may rotate between an open state and a closed state. The doors 44 may be connected to the body 40 with hinges (not shown) and, when the doors 44 are in the closed state, latches 46.

Figure 4:
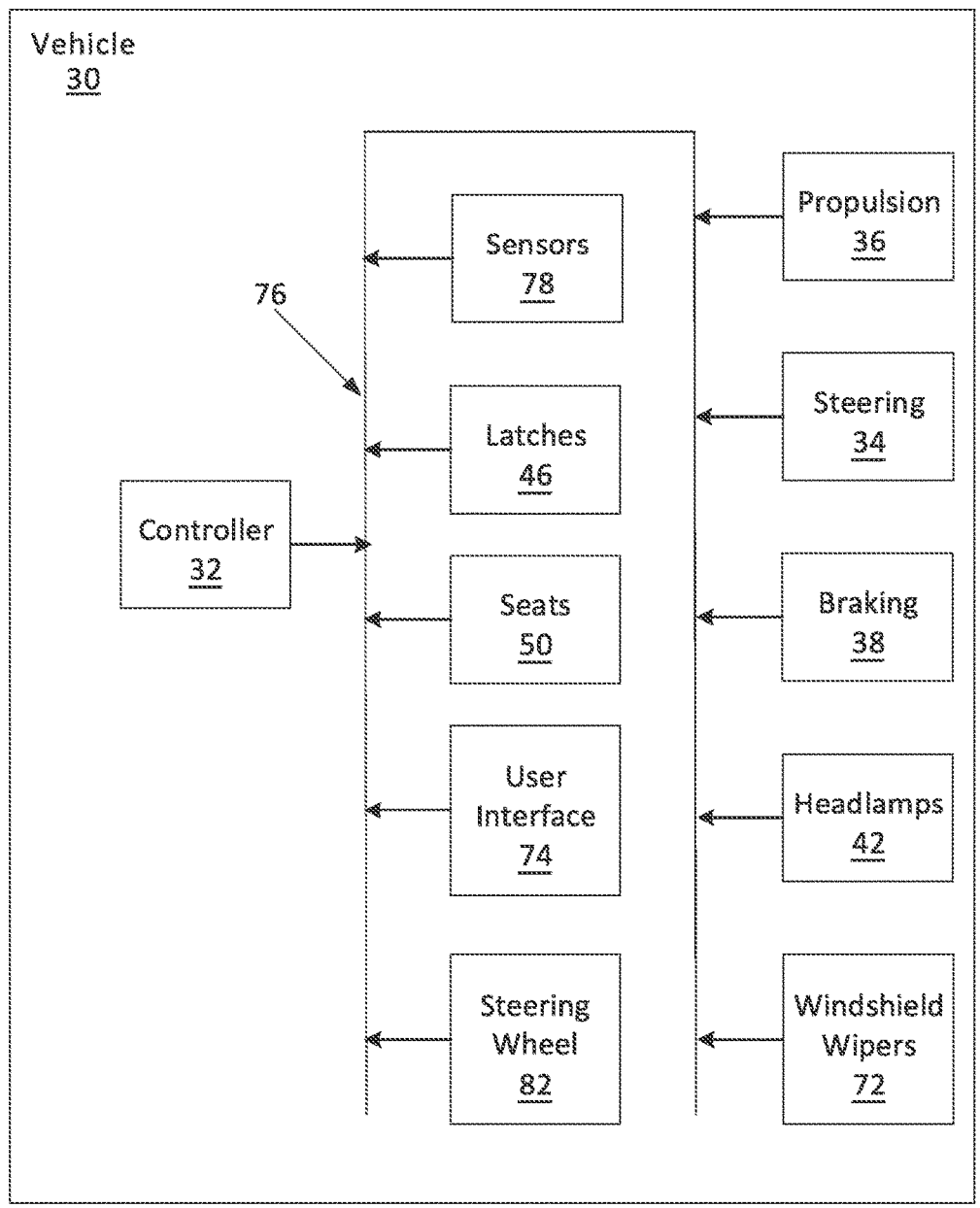
FIG. 4 is a block diagram of the vehicle of FIG. 1.

With reference to FIG. 4, the latches 46 are movable between a clasped state and a released state. If the door 44 is in the closed state, the latch 46 in the clasped state prevents the door 44 from transitioning, e.g., rotating, to the open state. If the door 44 is in the closed state, the latch 46 in the released state allows the door 44 to rotate to the open state. The latch 46 in both the clasped and released states may allow the door 44 to rotate from the open state to the closed state.

Figure 2:
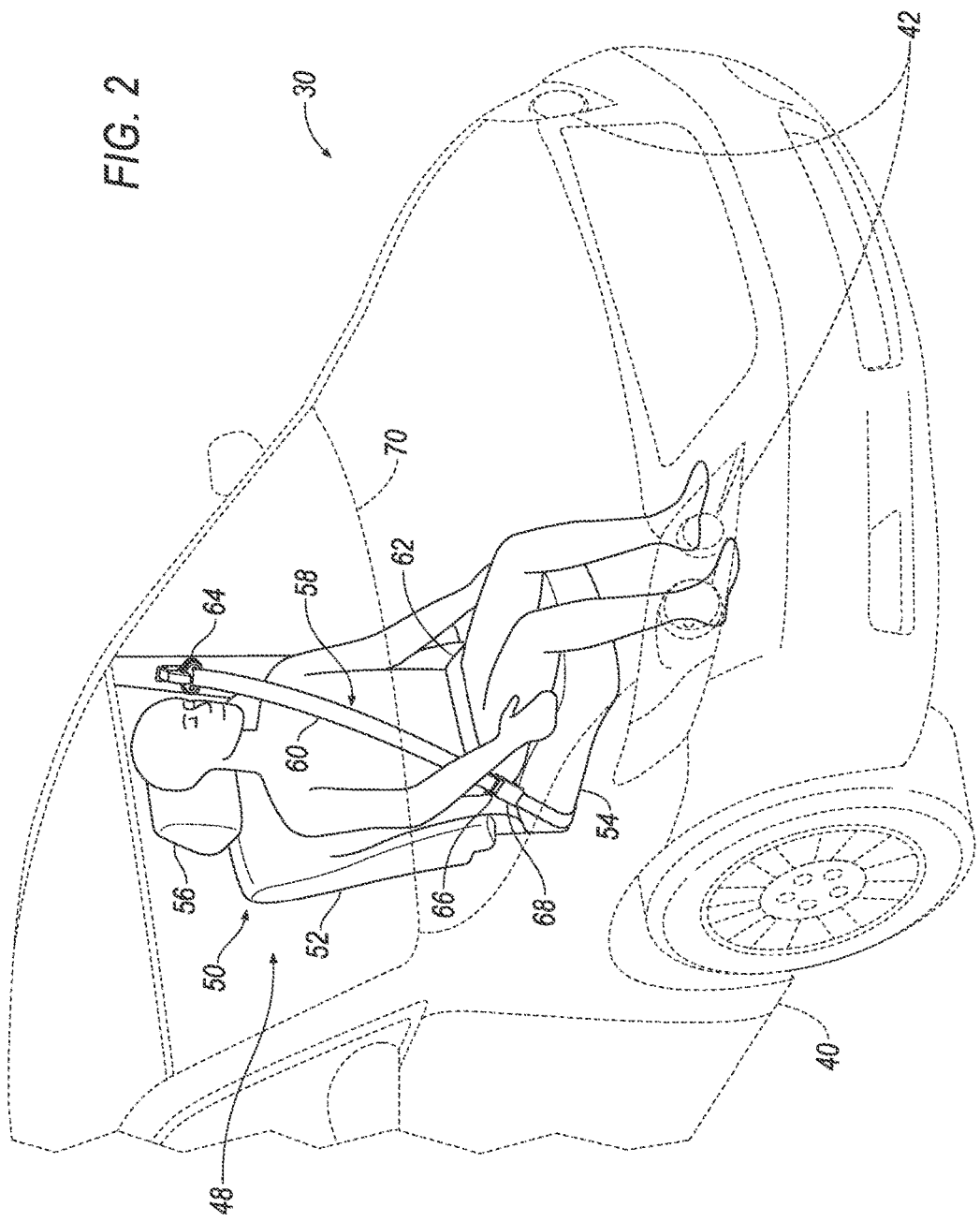
FIG. 2 is a perspective view of a seat in the vehicle of FIG. 1.

With reference to FIG. 2, the vehicle 30 includes a passenger cabin 48 to house occupants, if any, of the vehicle 30. The passenger cabin 48 includes one or more front seats 50 disposed at a front of the passenger cabin 48 and one or more back seats 50 disposed behind the front seats 50. One of the seats 50 may be a driver seat 50 and positioned to give an occupant of the driver seat 50 access to controls such as a steering wheel 80 for controlling the vehicle 30. The passenger cabin 48 may also include third-row seats (not shown) at a rear of the passenger cabin 48. In FIG. 2, the seat 50 is shown to be a bucket seat, but the seats 50 may be other types.

The seat 50 may include a seat back 52, a seat bottom 54, and a headrest 56. The headrest 56 may be supported by the seat back 52 and may be stationary or movable relative to the seat back 52. The seat back 52 may be supported by the seat bottom 54 and may be stationary or movable relative to the seat bottom 54. The seat back 52, the seat bottom 54, and/or the headrest 56 may be adjustable in multiple degrees of freedom. Specifically, the seat back 52, the seat bottom 54, and/or the headrest 56 may themselves be adjustable, in other words, adjustable components within the seat back 52, the seat bottom 54, and/or the headrest 56, and/or may be adjustable relative to each other. In particular, an angle of the seat back 52 may be adjustable relative to the body 40; i.e., the seat 50 may be reclined.

The vehicle 30 may include seatbelts 58. Each seatbelt 58 may include webbing 60, a lap-belt mounting 62, a retractor 64, a clip 66, and a buckle 68. The lap-belt mounting 62 attaches one end of the webbing 60 to the seat 50. Another end of the webbing 60 feeds into the retractor 64, which may include a spool (not shown) that extends and retracts the webbing 60. The clip 66 slides freely along the webbing 60 and is engageable with the buckle 68. The seatbelt 58 is changeable between a latched state, in which the clip 66 is engaged with the buckle 68, and an unlatched state, in which the clip 66 is disengaged from the buckle 68.

With reference to FIGS. 1 and 2, a windshield 70 may be fixed relative to the body 40. The windshield 70 may partially enclose the passenger cabin 48. The windshield 70 may be disposed in a vehicle-forward direction relative to the passenger cabin 48. The windshield 70 may be formed of any suitably durable transparent material, including glass such as laminated, tempered glass or plastic such as Plexiglas or polycarbonate.

With reference to FIG. 1, the vehicle 30 may include windshield wipers 72. The windshield wipers 72 may be attached at a lower edge of the windshield 70 and be rotatable across the windshield 70. The windshield wipers 72 may be bracket blades, beam blades, or any other suitable type of windshield wiper.

Figure 3:
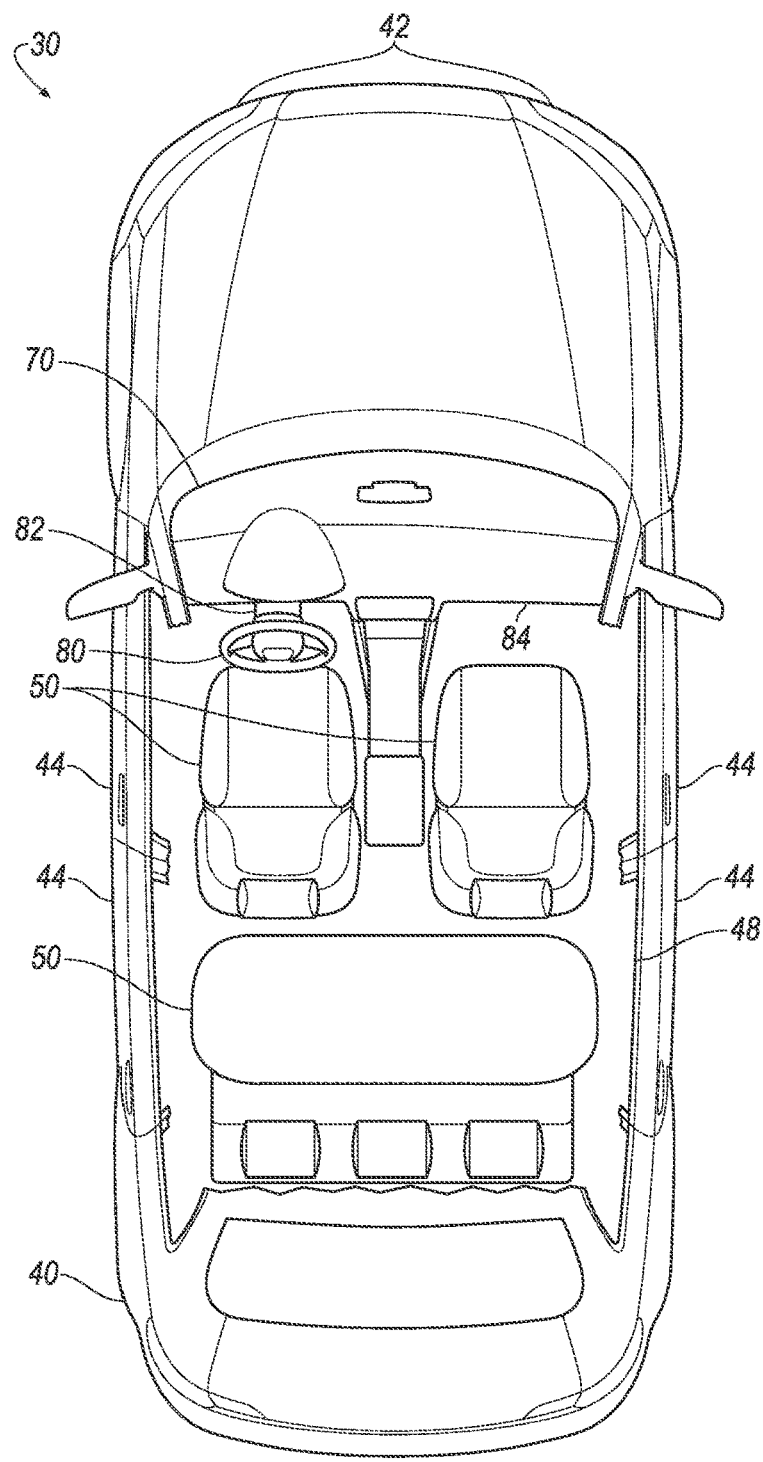
FIG. 3 is a cutaway top view of the vehicle of FIG. 1 to expose a passenger cabin for illustrative purposes.

With reference to FIG. 3, the steering wheel 80 and a steering column 82 may be disposed at a forward end of the passenger cabin 48 and facing the driver seat 50. The steering wheel 80 may be attached to the steering column 82 that connects to the steering 34. The steering wheel 80 may be rotatable relative to an instrument panel 84 disposed at a forward end of the passenger cabin 48 below the windshield 70. An occupant may rotate the steering wheel 80 to provide input to the steering 34. Additionally, a position of the steering wheel 80 may be adjustable. For example, the steering wheel 80 may be raised or lowered relative to the instrument panel 84, may tilt up or down relative to the instrument panel 84, and/or may retract toward or extend from the instrument panel 84.

A user interface 74 presents information to and receives information from an occupant of the vehicle 30. The user interface 74 may be located, e.g., on an instrument panel in the passenger cabin 48 of the vehicle 30, or wherever may be readily seen by the occupant. The user interface 74 may include dials, digital readouts, screens, speakers, and so on for providing information to the occupant, e.g., human-machine interface (HMI) elements such as are known. The user interface 74 may include buttons, knobs, keypads, microphone, and so on for receiving information from the occupant.

The vehicle 30 may be a semiautonomous vehicle. The controller 32, sometimes referred to as the "virtual driver," may be capable of operating the vehicle 30 independently of the intervention of a human operator, to a greater or a lesser degree. The controller 32 may be programmed to operate the steering 34, propulsion 36, braking 38, and/or other vehicle systems.

The vehicle 30 may be operable in different autonomy modes. An "autonomy mode" is a set of vehicle systems that the controller 32 operates and a set of conditions under which the controller 32 relinquishes control to a human operator. For example, an autonomy mode, sometimes referred to as semiautonomous control, may include control of one or two of steering 34, propulsion 36, and braking 38, e.g., of steering 34 and at least one of propulsion 36 and braking 38. For another example, an autonomy mode, sometimes referred to as fully autonomous control, may include control of each of steering 34, propulsion 36, and braking 38. For yet another example, an autonomy mode may have a null set of vehicle systems, that is, the human operator operates each of steering 34, propulsion 36, and braking 38. The set of conditions may depend on, for example, the driving environment. For example, an autonomy mode may deactivate based on inclement weather, an impending exit from a freeway, an upcoming construction zone, etc. For another example, an autonomy mode may have a null set of conditions, that is, the autonomy mode remains active regardless of the driving environment.

With reference to FIG. 4, the controller 32 carries out various operations, including as described herein. The controller 32 is a computing device that generally includes a processor and a memory, the memory including one or more forms of computer-readable media, and storing instructions executable by the processor for performing various operations, including as disclosed herein. The memory of the controller 32 further generally stores remote data received via various communications mechanisms; e.g., the controller 32 is generally configured for communications on a controller area network (CAN) bus or the like, and/or for using other wired or wireless protocols, e.g., Bluetooth, etc. The controller 32 may also have a connection to an onboard diagnostics connector (OBD-II). Via a vehicle network using Ethernet, WiFi, the CAN bus, Local Interconnect Network (LIN), and/or other wired or wireless mechanisms, the controller 32 may transmit messages to various devices in the vehicle 30 and/or receive messages from the various devices, e.g., controllers, actuators, sensors, etc., e.g., controllers and sensors as discussed herein. For example, the controller 32 may receive data from sensors 78. Although one controller 32 is shown in FIG. 4 for ease of illustration, it is to be understood that the controller 32 could include, and various operations described herein could be carried out by, one or more computing devices.

The controller 32 may transmit signals through a communications network 76 such as a controller area network (CAN) bus, Ethernet, Local Interconnect Network (LIN), and/or by any other wired or wireless communications network. The communications network 76 may connect the controller 32 to vehicle systems, including, for example, the steering 34, propulsion 36, and braking 38, as well as the sensors 78, for autonomous or semiautonomous operation. The communications network 76 may also connect the controller 32 to other vehicle systems, such as the steering wheel 80, the headlamps 42, the latches 46, the seats 50, and the windshield wipers 72.

The vehicle 30 may include the sensors 78. The sensors 78 may detect internal states of the vehicle 30, for example, wheel speed, wheel orientation, and engine and transmission variables. The sensors 78 may detect the position or orientation of the vehicle 30, for example, global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. The sensors 78 may detect the external world, for example, radar sensors, scanning laser range finders, light detection and ranging (LIDAR) devices, and image-processing sensors such as cameras. The sensors 78 may detect environmental conditions, for example, ambient-light sensors and sensors attached to the windshield 70 for detecting precipitation, such as pressure sensors for detecting impacts of raindrops or infrared sensors. The infrared precipitation sensors may project infrared light on the windshield 70 at a 45° angle and measure a proportion of the infrared light reflected back by the windshield 70, which is a function of the wetness of the windshield 70. The sensors 78 may include communications devices, for example, vehicle-to-infrastructure (V2I) or vehicle-to-vehicle (V2V) devices.

The steering 34 is typically a known vehicle steering subsystem and controls the turning of wheels of the vehicle 30. The steering 34 is in communication with and receives input from the steering wheel 80 and the controller 32. The steering 34 may be a rack-and-pinion system with electric power-assisted steering, a steer-by-wire system, as are both known, or any other suitable system.

The propulsion 36 of the vehicle 30 generates energy and translates the energy into motion of the vehicle 30. The propulsion 36 may be a known vehicle propulsion subsystem, for example, a conventional powertrain including an internal-combustion engine coupled to a transmission that transfers rotational motion to wheels; an electric powertrain including batteries, an electric motor, and a transmission that transfers rotational motion to the wheels; a hybrid powertrain including elements of the conventional powertrain and the electric powertrain; or any other type of propulsion. The propulsion 36 is in communication with and receives input from the controller 32 and from a human operator. The human operator may control the propulsion 36 via, e.g., an accelerator pedal and/or a gear-shift lever.

The braking 38 is typically a known vehicle braking subsystem and resists the motion of the vehicle 30 to thereby slow and/or stop the vehicle 30. The braking 38 may be friction brakes such as disc brakes, drum brakes, band brakes, and so on; regenerative brakes; any other suitable type of brakes; or a combination. The braking 38 is in communication with and receives input from the controller 32 and a human operator. The human operator may control the braking 38 via, e.g., a brake pedal.

Figure 5:
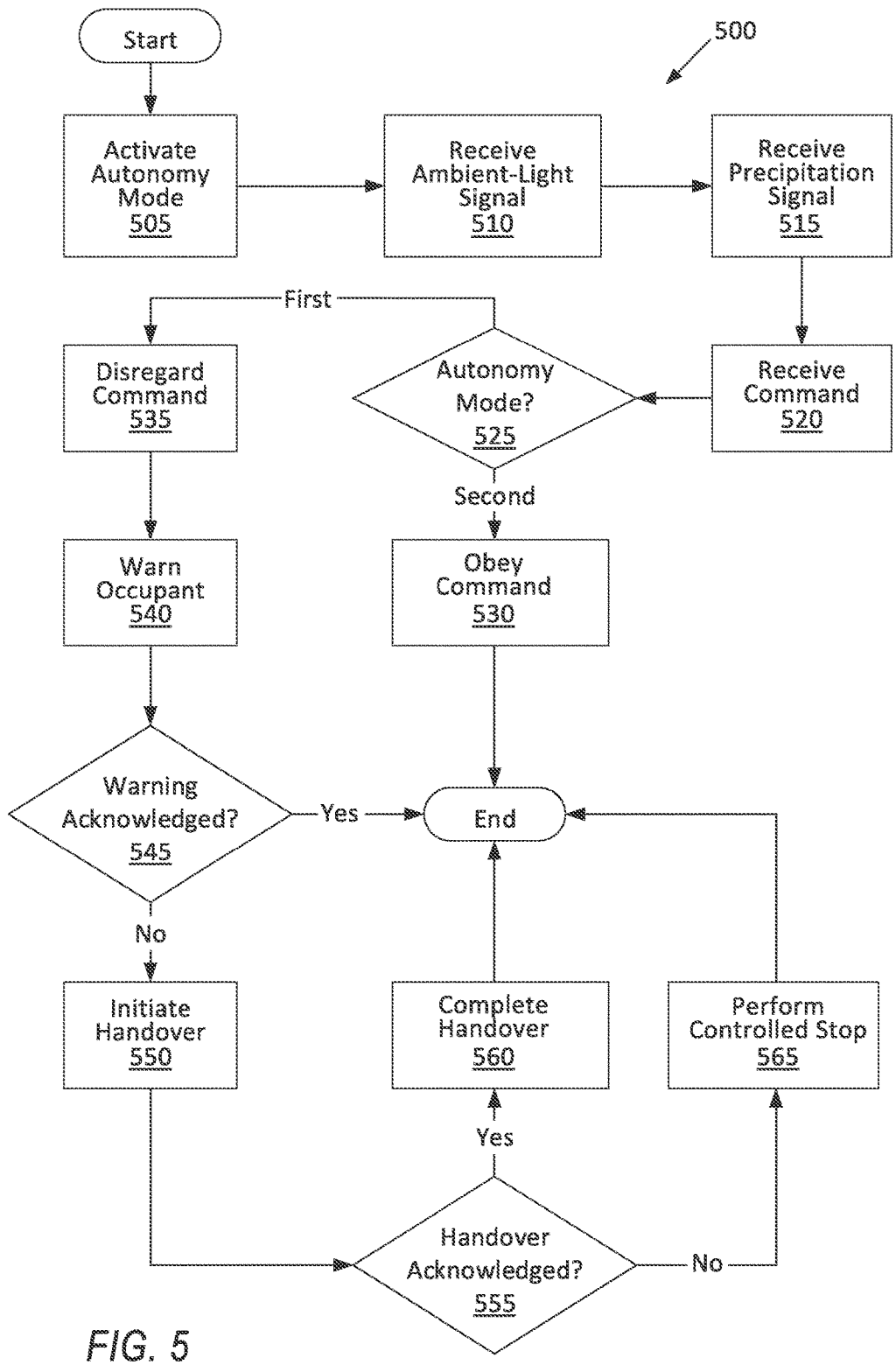
FIG. 5 is a process flow diagram of a process for preventing distractions to a human operator when the vehicle is in a semiautonomous mode.

FIG. 5 is a process flow diagram illustrating an exemplary process 500 for providing output to an occupant, e.g., an operator, when the vehicle 30 is in a semiautonomous mode. The process 500 begins in a block 505, in which the controller 32 activates a first autonomy mode to control steering 34 and at least one of propulsion 36 and braking 38. The controller 32 may activate the first autonomy mode upon receiving a command to do so from a human operator. Activating an autonomy mode means switching to that autonomy mode from a different autonomy mode, and deactivating an autonomy mode means switching out of that autonomy mode into a different autonomy mode.

Next, in a block 510, the controller 32 receives a signal indicating an intensity of ambient light from the sensors 78 through the communications network 76. The controller 32 interprets the signal to determine how light or dark an environment outside the vehicle 30 is. For example, the signal may depend on a photometric quantity such as luminous intensity (typically measured in lumens per steradian) or luminance (lumens per steradian meters squared) or on a radiometric quantity such as radiant intensity (watts per steradian) or irradiance (watts per meters squared).

Next, in a block 515, the controller 32 receives a signal indicating precipitation from the sensors 78 through the communications network 76. The controller 32 interprets the signal to determine whether and/or how intensely rain, sleet, snow, etc. is falling in the environment outside the vehicle 30. For example, the signal may depend on a proportion of infrared light projected onto the windshield 70 that is reflected back to the sensor 78.

Next, in a block 520, the controller 32 receives a command from the human operator to perform an action interfering with an ability of the human operator to one of see a field of travel of a vehicle 30 and provide input to the vehicle 30. The memory of the controller 32 may store a list of commands that potentially interfere with vision or control by the human operator so that the controller 32 can recognize a command as such. Commands that do not potentially interfere with vision or control by the human operator do not count for the block 520, and the process 500 only proceeds to a decision block 525 upon receiving a command that does interfere with vision or control by the human operator. The potentially interfering command may be one of, for example, deactivating the windshield wipers 72 while precipitation is detected, deactivating the headlamps 42 while ambient light is below an intensity threshold, reclining the driver seat 50 beyond an angular threshold, adjusting a position of the steering wheel 80, unbuckling a driver seatbelt 58, and opening a driver door 44. The driver seatbelt 58 is the one of the seatbelts 58 that is fitted to the driver seat 50. The driver door 44 is the door 44 that is adjacent to the driver seat 50. Whether a command is a command that interferes with vision or control by the human operator may be conditional, that is, may depend on data stored by the memory of the controller 32, for example, the ambient-light signal and the precipitation signal. For example, if the ambient-light signal is below a threshold, then the command to deactivate the headlamps 42 is a command that potentially interferes with vision or control by the human operator. The threshold for the ambient-light signal may be chosen by experimentation to ensure that the environment is sufficiently illuminated for the human operator to see the environment, e.g., dim conditions. For another example, if the precipitation signal is above or below a threshold, then the command to deactivate the windshield wipers 72 is a command that potentially interferes with vision or control by the human operator. The threshold for the precipitation signal may be chosen by experimentation to ensure that the human operator can see sufficiently clearly through the windshield 70, e.g., the presence or absence of rainfall or condensing mist.

Next, in the decision block 525, the controller 32 determines whether the vehicle 30 is in the first autonomy mode or a second autonomy mode. In the first autonomy mode, the controller 32 controls steering 34 and at least one of propulsion 36 and braking 38; in other words, the first autonomy mode may be semiautonomous operation such as NHTSA or SAE Level 2 or 3 autonomous operation. The second autonomy mode is a different autonomy mode from the first autonomy mode and is an autonomy mode in which the controller 32 should not disregard potentially interfering commands from the human operator, as discussed below with respect to a block 535. For example, the second autonomy mode may be the controller 32 controlling none of steering 34, propulsion 36, and braking 38, that is, nonautonomous operation. For another example, the second autonomy mode may be the controller 32 controlling each of steering 34, propulsion 36, and braking 38 with no conditions under which control is relinquished to the human operator, that is, full autonomous control such as NHTSA Level 4 autonomous operation.

While the vehicle 30 is in the second autonomy mode, next, in a block 530, the controller 32 obeys the command. The controller 32 may obey the command by instructing a vehicle subsystem to perform the command, such as instructing the seat 50 to recline beyond a threshold or the headlamps 42 to deactivate when the ambient light is low. After the block 530, the process 500 ends.

While the vehicle 30 is in the first autonomy mode, after the decision block 525, in a block 535, the controller 32 disregards the command from the human operator to perform an action interfering with an ability of the occupant to see a field of travel of the vehicle 30 and/or provide input to the vehicle 30. Disregarding a command may involve failing to instruct a vehicle subsystem to perform the command after receiving the command, may involve instructing a vehicle system to not perform the command after the command was transmitted to the vehicle system, or may involve any other sequence of actions in which a vehicle system responsible for performing the command does not perform the command after the human operator issues the command. For example, while in the first autonomy mode, the controller 32 may disregard a command to deactivate the windshield wipers 72 based on the signal indicating precipitation intensity. The threshold for the precipitation intensity may be chosen to ensure that the human operator can see sufficiently clearly through the windshield 70, as described above. For another example, while in the first autonomy mode, the controller 32 may disregard a command to deactivate the headlamps 42 based on the signal indicating the intensity of ambient light. The threshold for the ambient-light signal may be chosen to ensure that the environment is sufficiently illuminated for the human operator to see the environment, as described above. For yet another example, while in the first autonomy mode, the controller 32 may disregard a command to recline the driver seat 50 beyond an angular threshold. The angular threshold of the seat back 52 relative to the body 40 may be chosen to ensure that the human operator is sufficiently upright to see through the windshield 70.

Next, in a block 540, the controller 32 warns the human operator that the controller 32 is disregarding the command through the user interface 74. The warning may be visual, aural, haptic, or any other manner of communicating to the human operator. The warning may notify the human operator to remain attentive while the vehicle 30 is in the first autonomy mode. The warning may request an acknowledgement from the human operator that the human operator is attentive.

Next, in a decision block 545, the controller 32 determines whether the human operator provided the acknowledgement of attentiveness. The acknowledgement may be, for example, pushing a button, placing hands on the steering wheel 80, speaking a phrase, etc. The controller 32 may use, for example, a timer to determine whether an acknowledgement has been received within a time limit. If the acknowledgement is received within the, e.g., time limit, then the process 500 ends.

If the controller 32 does not receive the acknowledgement within the, e.g., time limit, next, in a block 550, the controller 32 initiates a handover. A handover is a switch from the first autonomy mode to an autonomy mode in which the human operator controls each of steering 34, propulsion 36, and braking 38. The controller 32 may initiate the handover by requesting an acknowledgment of the handover from the human operator. The request may be visual, aural, haptic, or any other manner of communicating to the human operator.

Next, in a decision block 555, the controller 32 determines whether the human operator provided the acknowledgement of handover. The acknowledgement may be, for example, pushing a button, placing hands on the steering wheel 80, speaking a phrase, etc. The controller 32 may use, for example, a timer to determine whether an acknowledgement has been received within a time limit.

If the controller 32 receives the acknowledgement within the, e.g., time limit, next, in a block 560, the controller 32 completes the handover. In other words, while in the first autonomy mode, the controller 32 deactivates the first autonomy mode in response to the command and switches to a nonautonomous autonomy mode. After the block 560, the process 500 ends.

If the controller 32 does not receive the acknowledgement within the, e.g., time limit, after the decision block 555, in a block 565, the controller 32 performs a controlled stop. In other words, while in the first autonomy mode, the controller 32 stops the vehicle 30 in response to the command. The controller 32 may perform a controlled stop, for example, slowing gradually and pulling over to a shoulder of a road, as is known.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A controller comprising a processor and a memory storing processor-executable instructions, wherein the processor is programmed to:
   activate a first autonomy mode to control steering and at least one of propulsion and braking; and
   while in the first autonomy mode, disregard a command from an occupant to at least one of adjust a position of a steering wheel or, if a safety threshold is exceeded, deactivate windshield wipers or headlamps or recline a driver seat.

2. The controller of claim 1, wherein the processor is further programmed to, while in a second autonomy mode, obey the command from the occupant.

3. The controller of claim 1, wherein the processor is further programmed to deactivate the first autonomy mode based on a driving environment.

4. The controller of claim 1, wherein the first autonomy mode includes control of each of steering, propulsion, and braking; and the processor is further programmed to deactivate the first autonomy mode based on a driving environment.

5. The controller of claim 1, wherein the processor is further programmed to, while in the first autonomy mode, deactivate the first autonomy mode in response to the command.

6. The controller of claim 1, wherein the processor is further programmed to, while in the first autonomy mode, stop the vehicle in response to the command.

7. A controller comprising a processor and a memory storing processor-executable instructions, wherein the processor is programmed to:
   activate a first autonomy mode to control steering and at least one of propulsion and braking; and
   while in the first autonomy mode, disregard a command to one of deactivate windshield wipers while precipitation is detected, deactivate headlamps while ambient light is below an intensity threshold, and recline a driver seat beyond an angular threshold.

8. The controller of claim 7, wherein the processor is further programmed to, while in a second autonomy mode, obey the command.

9. The controller of claim 7, wherein the processor is further programmed to deactivate the first autonomy mode based on a driving environment.

10. The controller of claim 7, wherein the first autonomy mode includes control of each of steering, propulsion, and braking; and the processor is further programmed to deactivate the first autonomy mode based on a driving environment.

11. The controller of claim 7, wherein the processor is further programmed to, while in the first autonomy mode, deactivate the first autonomy mode in response to the command.

12. The controller of claim 7, wherein the processor is further programmed to, while in the first autonomy mode, stop the vehicle in response to the command.

13. The controller of claim 7, wherein the processor is further programmed to receive a signal indicating precipitation, and while in the first autonomy mode, to disregard a command to deactivate the windshield wipers based on the signal.

14. The controller of claim 7, wherein the processor is further programmed to receive a signal indicating an intensity of ambient light, and while in the first autonomy mode, to disregard a command to deactivate the headlamps based on the signal.

15. The controller of claim 7, wherein the processor is further programmed, while in the first autonomy mode, to disregard a command to recline the driver seat beyond the angular threshold.

16. A method comprising:
   activating a first autonomy mode to control steering and at least one of propulsion and braking; and
   while in the first autonomy mode, disregarding a command from an occupant to at least one of adjust a position of a steering wheel or, if safety threshold is exceeded, deactivate windshield wipers or headlamps or recline a driver seat.

17. The method of claim 16, further comprising, while in a second autonomy mode, obeying the command from the occupant.

18. The method of claim 16, further comprising deactivating the first autonomy mode based on a driving environment.

* * * * *